United States Patent Office 2,907,666
Patented Oct. 6, 1959

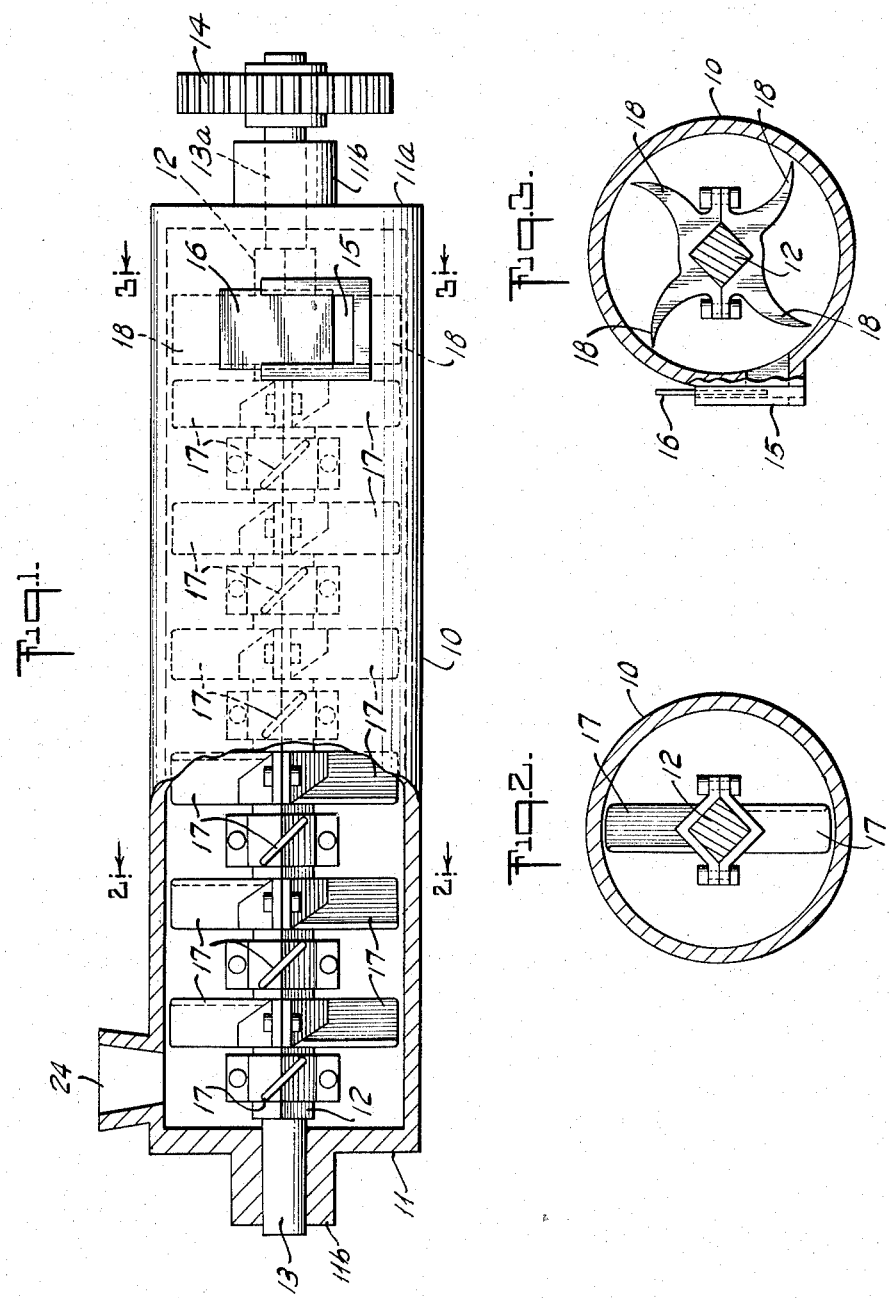

2,907,666

APPARATUS AND METHOD FOR TREATMENT OF CLAY

Nathan Millman and James B. Whitley, Macon, Ga., assignors to J. M. Huber Corporation, Borger, Tex., a corporation of New Jersey Application July 6, 1956, Serial No. 596,357

2 Claims. (Cl. 106—72)

This invention relates to apparatus and a method for the treatment of clay, and more particularly to the treatment of kaolinitic clays, in such a manner as to produce slips of low viscosity.

Kaolin slips are widely used for coating paper, fillers for various liquid materials, such as, for example, water paints as casting slip, in the manufacture of pottery and in other industries for various purposes. However, for effective and efficient use, these slips should contain as much as 80 parts clay in 20 parts water. Where such a high concentration of clay obtains, it is difficult to reduce the viscosity of the slip to a usable value. For example, the viscosity of the kaolin as mined may well be of the order of 700 centipoises or more, whereas the desired viscosity of the slip may be of the order of 100 centipoises. On the other hand, where the kaolin concentration is around 65%, the clay is often too soft to be effectively and efficiently worked.

Regardless, however, of the initial viscosity of the raw kaolin, if it is usable at all, its viscosity must be reduced by working it, e.g. kneading it with a sufficiently high energy input. It follows that in order to work the clay at such a high rate, the clay must be in such condition as to resist any force imposed on it. For example, if raw clay of 75% concentration (75 pounds of kaolin and 25 pounds of water) is worked in conventional kneading apparatus, its physical characteristics are such that it tends to crumble rather than oppose the forces imposed by the mixing paddles or such mixing means as are used where such paddles operate in an open or loosely covered tank. Under such conditions the kaolin is unable to adsorb or otherwise immobilize the entrained water content thereof and it is impossible to reduce its viscosity by any appreciable amount, or to obtain the desired plastic consistency.

While kaolin clay has been satisfactorily worked in conventional kneading mills, it has been necessary to use a peptizing agent such as sodium hexamethaphosphate, for example. When such a peptizing agent is used, it causes the clay to knit into a heavy and very viscous putty-like mass which will resist motion and upon which work can be done at an energy level sufficiently high to alter the properties of the clay. Such a method is disclosed in U.S. Patent 2,535,647 to Millman et al. Under certain circumstances, however, it has been found that the use of a peptizing agent is undesirable.

It is accordingly among the objects of this invention to provide apparatus for and a method of treating kaolin clay in such a manner as to alter its properties without resorting to the use of a peptizing agent.

Other objects will be in part apparent and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the appended claims.

In the drawing, wherein there is shown one embodiment of the apparatus used in my method of treating kaolin clay, Figure 1 is a side view of a clay kneading mill with a portion of the housing broken away to show the kneading paddles;

Figure 2 is a sectional elevation taken along the line 2—2 of Figure 1; and

Figure 3 is a sectional elevation taken along the line 3—3 of Figure 1.

Various types of equipment are suitable for use in the practice of our method, as described hereinafter. One such apparatus is very generally disclosed in the aforementioned Millman et al. patent. In the practice of our improved method, however, this device is modified so as to include a relatively heavy shell or casing, and a cover which can be tightly secured to the top of the casing by any suitable fastening bolts or the like. Within the casing are a plurality of mixing or kneading blades rotatable in opposite directions, and timed so as to have overlapping sweep. Using this apparatus, where the casing had a capacity of about 5 liters, kaolin clay directly from the mine and containing about 78% kaolin was experimented with. A portion of this kaolin clay was first made into a slip containing exactly 70% kaolin, and was peptized to a minimum viscosity by the addition of 0.3% hexametaphosphate. This slip was then passed through a 100-mesh screen, and the viscosity was determined to be 652 centipoises. We next placed 6150 grams of the kaolin clay in the mixing device and operated it without the cover and in the absence of a peptizing agent. After ten minutes of kneading, the temperature had increased only 4.5° C., and the clay crumbled, with unsatisfactory kneading action. A slip made from the crumbly clay product was passed through a 100-mesh screen, as in the case of the peptized slip, and the viscosity was determined as 615 centipoises. We then recharged the machine with a fresh sample of 6150 grams, without the addition of a peptizing agent, and the cover of the machine was bolted on securely, the amount of the charge of the kaolin clay being such that it was squeezed tightly by the cover. In other words, the machine casing with the cover bolted on was full of kaolin clay. The machine was again then operated at the same speed as formerly. After five minutes the temperature had increased 10° C., and after ten minutes it had increased 18.5° C. The viscosity of a slip similarly made from the resulting product was then measured as with the previous samples, and it was found to have been reduced to 106 centipoises, or only about 16% of its original value. We then charged the mixing or kneading machine with 5720 grams of the kaolin clay and 660 grams of water, again without adding a peptizing agent, thus reducing the kaolin content to about 70%. Again the cover was securely fastened to the casing and the machine was operated at the same speed as in the other examples. After five minutes the temperature had increased 6.5° C., and after ten minutes 10.5° C. Again using the 100-mesh screen, the viscosity of a similarly prepared slip was determined as 157 centipoise, i.e. only 24% of the original value.

Referring now to Figure 1 of the drawing, the preferred form of our kneading machine may include an elongated strong cylindrical housing or shell 10 tightly closed at its ends by walls 11 and 11a. Mounted on or preferably formed integrally with end walls 11 and 11a are heavy bearings 11b in which shaft ends 13 and 13b are journalled, one end of the shaft having a gear 14 secured thereto by means of which the shaft may be rotated.

Housing 10 is provided at its entry end with a funnel-shaped opening 24 through which the clay is fed into the machine. At the exit end of housing 10 is a variable area opening 15 provided with a slidable door 16 by adjustment of which the area of opening 15 may be varied, thus to control the rate of movement of clay through the machine.

As may be seen by reference to Figure 2, interior shaft 12 is preferably square in cross-section, and has secured thereto in any desirable manner a plurality of spaced paddles 17. Each of these paddles preferably has two blades set at an angle as shown in Figure 1, the blades of adjacent paddles being set at 90° to one another. Thus, upon rotation of the shaft the paddle blades work on the clay with a kneading action and also force the clay toward the exit opening 15.

As shown in Figure 3, a set of arcuate wiper blades 18 are attached to shaft 12 adjacent exit opening 15; upon rotation these blades force the clay through the opening.

While the kneading machine may be of any desired size within reasonable limits, we have found that excellent results may be obtained where the housing 10 is ten feet long and two feet in diameter. Using a machine of that size, it is possible to work the clay at the rate of 13,000 pounds per hour.

In operation, kaolin directly from the mine and having a water content of about 28% was fed into the machine in the absence of a peptizing agent, and at a rate of 13,000 pounds per hour. As the clay progressed through the housing, it was worked on by the blades 17 and, being confined by the housing, offered such resistance to the blades that its temperature increased 9° C. after but three feet of travel. By the time the clay reached the exit opening 15 its temperature had increased 16° C. and the retention time in the machine was about eighteen minutes. The effectiveness of the treatment was indicated by the reduction in viscosity of the clay from 715 centipoises as introduced to 103 centipoise after treatment.

While the amount of kaolin in the mixture to be treated can be varied within considerable limits, the consistency must be stiff enough to offer resistance to flow, but yet must not be so stiff that it cannot be manipulated by the kneading machine. In general, we have found that concentrations of kaolin less than about 65% are too soft to offer sufficient resistance to flow, while concentrations above 80% have usually been found too stiff to be worked by the machine.

Accordingly, it may be seen that we have attained the several objects hereinbefore mentioned in a thoroughly practical and efficient manner.

As many possible embodiments may be made of the mechanical features of the above invention, and as the art herein described might be varied in various parts, all without departing from the scope of the invention, it is to be understood that all matter hereinabove set forth, or shown in the accompanying drawing, is to be interpreted as illustrative and not in a limiting sense.

We claim:

1. A method of treating kaolin to improve its processing properties, which includes the steps of, introducing a peptizing agent-free mixture of kaolin and water in the proportions of from about 65% to about 80% of kaolin and about 35% to about 20% of water into a kneading device, closely confining the mixture in said device so that it strongly resists the kneading action thereof, and kneading the confined mixture until the temperature of the mixture has increased about 10° to about 19° C. as a measure of the mechanical work performed on the mixture by the confined kneading.

2. A method of treating kaolin to improve its processing properties which includes the steps of, continuously feeding a peptizing agent-free mixture of kaolin and water in the proportions of from about 65% to about 80% of kaolin and about 35% to about 20% of water into a device wherein work at high energy input can be done on the mixture, working said mixture at high energy input in said device, while closely confining said mixture in said device so that the mixture resists force imposed on it, until the temperature of the mixture has increased about 10° to about 19° C. as a measure of the mechanical work performed on the mixture by the confined working, to assure ultimate attainment of a kaolin slip having a viscosity from about 100 to about 160 centipoise.

References Cited in the file of this patent

UNITED STATES PATENTS

| | | |
|---|---|---|
| 2,535,647 | Millman et al. | Dec. 26, 1950 |
| 2,677,619 | Eirich et al. | May 4, 1954 |

OTHER REFERENCES

Journal of the American Ceramic Society, vol. 17, 1934, pages 262–267.

Journal of the American Ceramic Society, vol. 18, 1935, pages 201–203.

Martin, Industrial Chemistry (Inorganic), 2nd ed., vol. II, Crosby Lockwood & Son, London, 1918, pages 205–206.